F. F. SCOVILLE.
LOCOMOTIVE CYLINDER.
APPLICATION FILED OCT. 8, 1915.
1,172,841.
Patented Feb. 22, 1916.
5 SHEETS—SHEET 2.
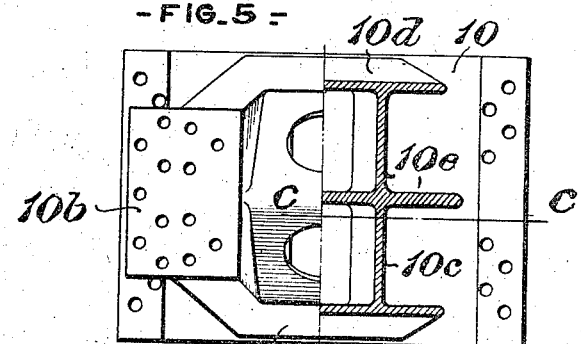
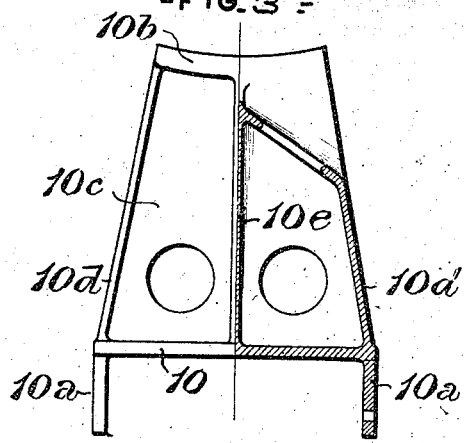
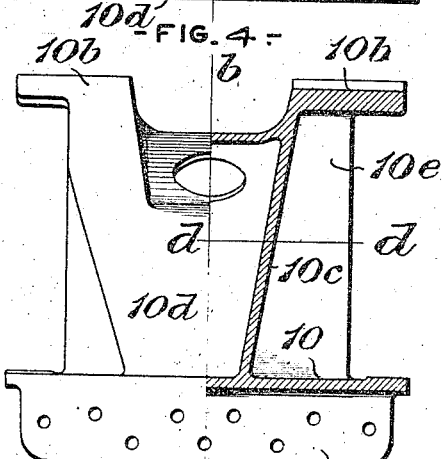
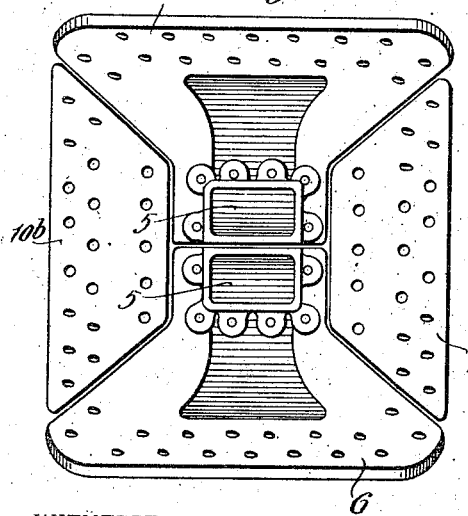
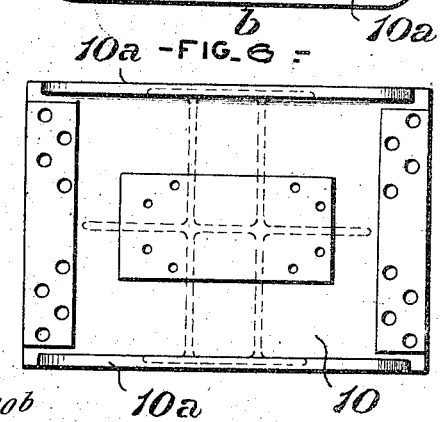
WITNESSES
Edward H. Wright
S. R. Bell
INVENTOR.
Frank F. Scoville

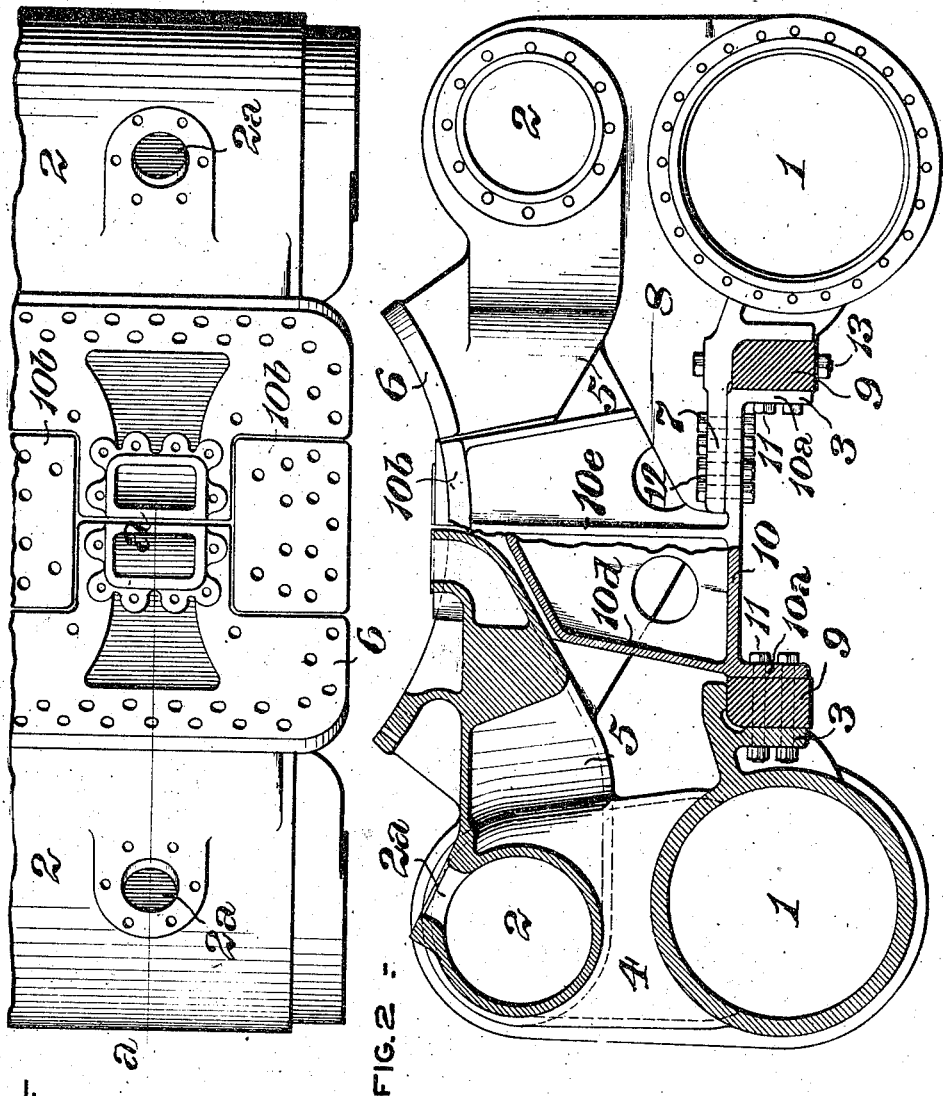

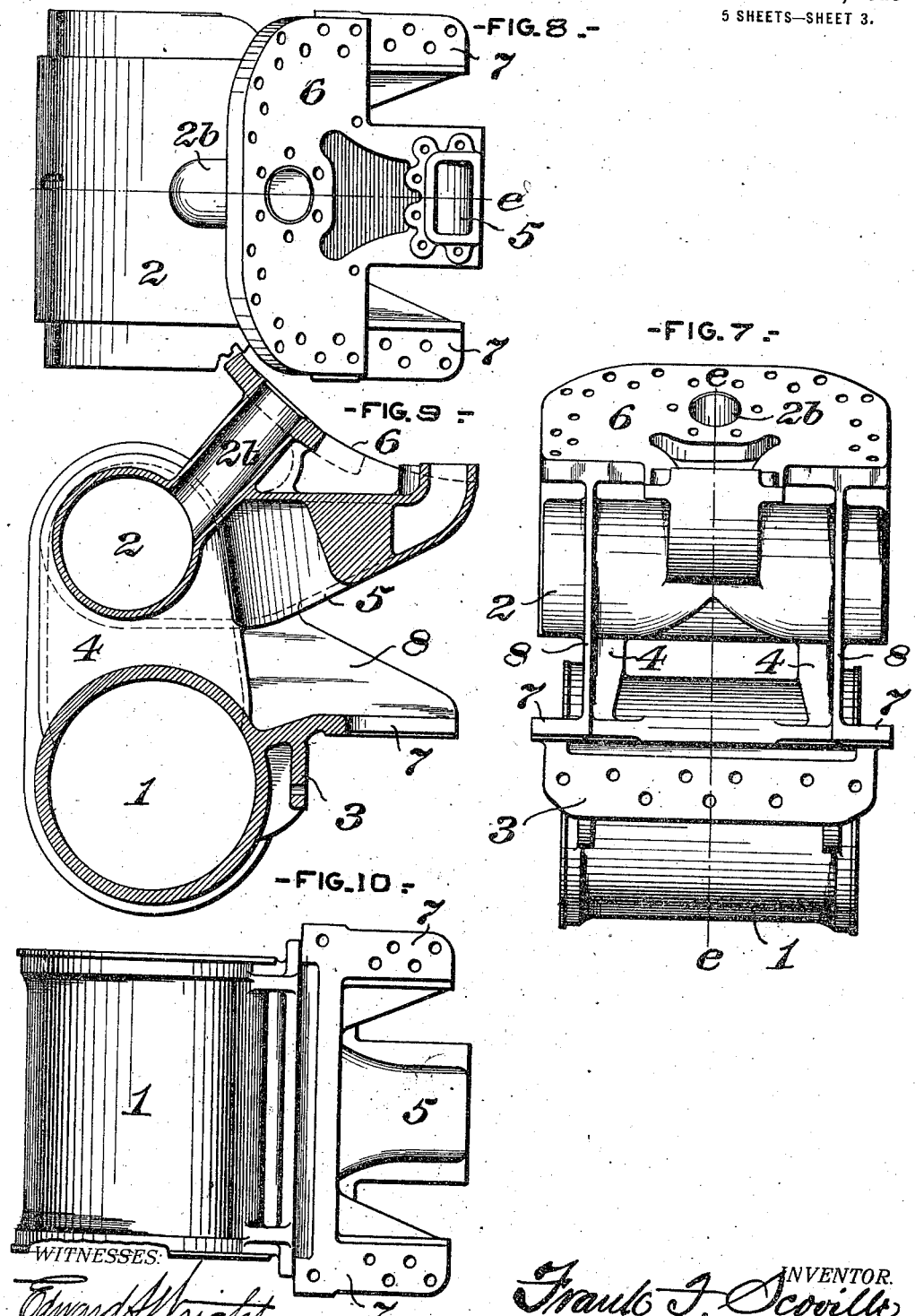

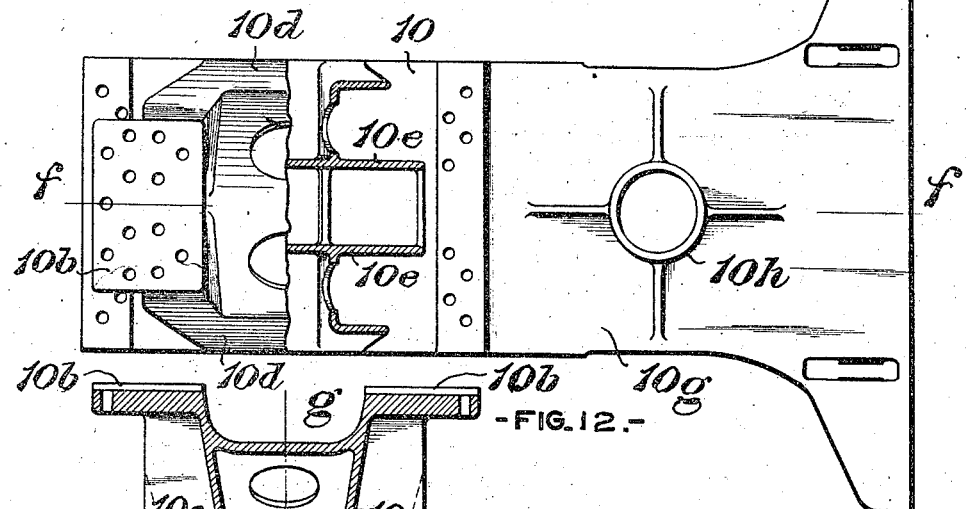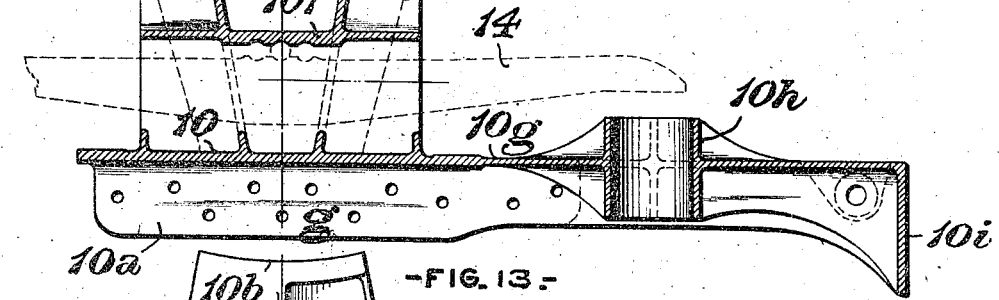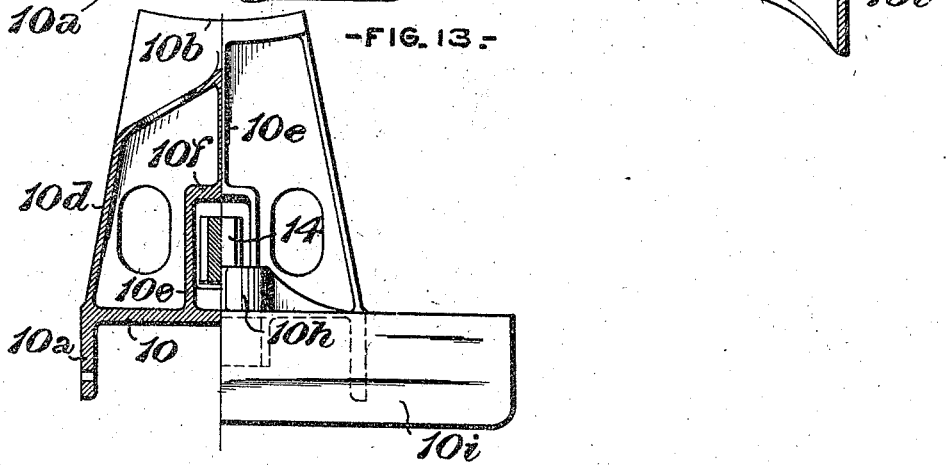

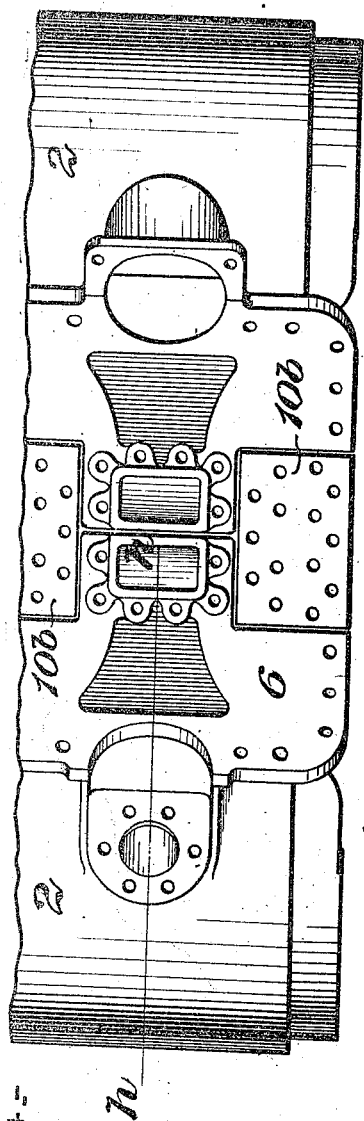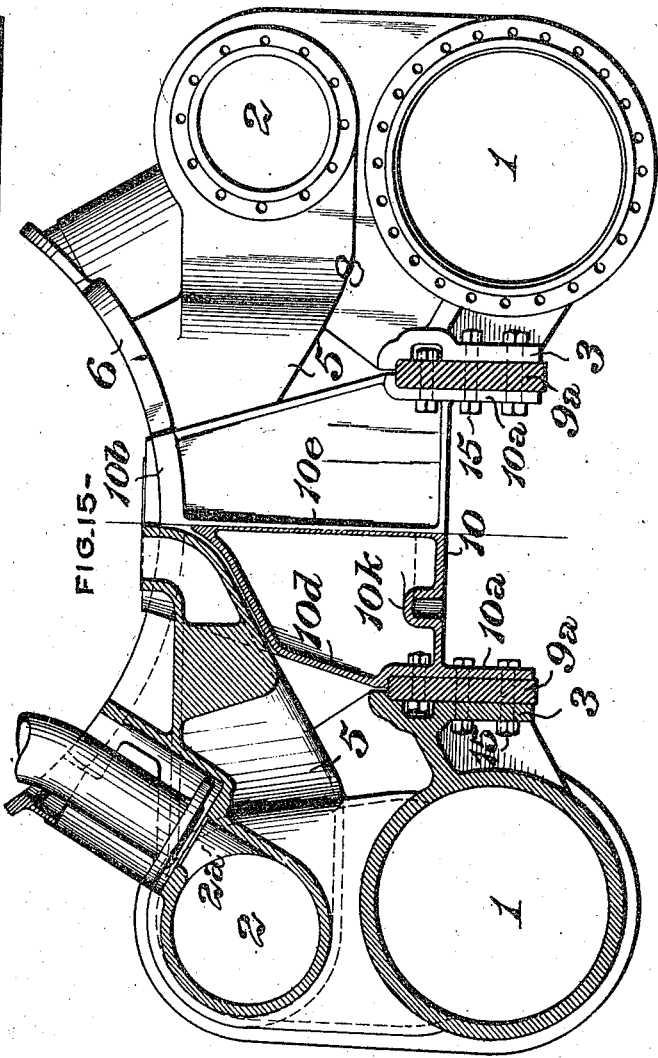

UNITED STATES PATENT OFFICE.

FRANK F. SCOVILLE, OF SCHENECTADY, NEW YORK.

LOCOMOTIVE-CYLINDER.

1,172,841.

Specification of Letters Patent. Patented Feb. 22, 1916.

Application filed October 8, 1915. Serial No. 54,727.

*To all whom it may concern:*

Be it known that I, FRANK F. SCOVILLE, of Schenectady, in the county of Schenectady and State of New York, have invented a certain new and useful Improvement in Locomotive - Cylinders, of which improvement the following is a specification.

The object of my invention is to provide a cylinder which shall be desirably applicable in locomotive engines of any of the present standard types, and which shall embody the advantages of facility of molding, strength and lightness of construction, reduction of number of steam joints, and adaptability for connection to either outside or inside steam pipes, and to engine frames of either the bar or the slab type, as may be desired.

The improvement claimed is hereinafter fully set forth.

In the accompanying drawings: Figure 1 is a partial plan or top view of a pair of locomotive cylinder members and an interposed connecting member, illustrating an application of my invention; Fig. 2, a view, the right hand half of which is a front elevation of one of the cylinder members and the adjoining half of the connecting member, and the left hand half, a vertical section, on the line $a\,a$ of Fig. 1; Fig. 3, a view of the connecting member, half in front elevation and half in vertical transverse section on the line $b\,b$ of Fig. 4; Fig. 4, a view of the same, half in side elevation and half in vertical longitudinal section on the line $c\,c$ of Fig. 5; Fig. 5, a view of the same, half in plan and half in horizontal section on the line $d\,d$ of Fig. 4; Fig. 6, a bottom view of the same; Fig. 7, a view, in elevation, of a cylinder member, as seen from the side adjoining the connecting member; Fig. 8, a plan view; Fig. 9, a vertical transverse section, on the line $e\,e$ of Figs. 7 and 8; Fig. 10, a bottom view; Fig. 11, a plan view, partly in section, of a connecting member, illustrating a structural modification; Fig. 12, a vertical longitudinal section through the same, on the line $f\,f$ of Fig. 11; Fig. 13, a view, half in front elevation and half in vertical transverse section on the line $g\,g$ of Fig. 12, of the same; Fig. 14, a partial plan or top view of a pair of locomotive cylinder members and a connecting member, illustrating a structural modification; Fig. 15, a view, the right hand half of which is a front elevation of one of the cylinder members and the adjoining half of the connecting member, of the construction shown in Fig. 14, and the left hand half, a vertical section, on the line $h\,h$ of Fig. 14; and, Fig. 16, a plan view, on a reduced scale, showing another structural modification.

Referring first to Figs. 1 to 10 inclusive, of the drawings, I provide two counterpart cylinder members, each of which is an integral casting, which comprises the following parts, to wit: a cylinder proper, 1, which is located on the outer side of the cylinder member, *i. e.*, that which is farther from the longitudinal central plane of the locomotive; a distribution valve chest, 2, located above the cylinder; a vertical frame connection flange, 3, extending longitudinally on the side of the cylinder nearer the longitudinal central plane of the locomotive; induction and eduction steam passages, 4, 4, connecting the cylinder and valve chest, adjacent to their ends; two exhaust passages, 5, 5, extending inwardly from the valve chest to the inner side of the cylinder member; a transversely curved smoke box seat, 6, which is located above the exhaust passages, and is of greater length on its outer side than on its side that adjoins the counterpart cylinder member, so that the inner portions of its ends may abut against a connecting member hereinafter described; and thereby being either of substantially T form in plan, as shown in Figs. 1, 8 and 14, or substantially triangular, as in Fig. 16; horizontal connecting member bearings, 7, 7, each extending inwardly from the cylinder, 1, adjacent to one of its ends; and vertical strengthening ribs, 8, 8, adjoining the induction and eduction passages and extending from the connecting member bearings to the smoke box seat. A suitable inlet opening or nozzle, $2^a$, is formed in the top of the valve chest, for the connection of a steam supply pipe, which, in the instance shown in Figs. 1 and 2, would be of the "outside" type. As shown in Figs. 7 to 9 inclusive, an inwardly extending passage, $2^b$, is formed on the valve chest, for the connection of an "inside" steam pipe.

The cylinder members above described are not, as in ordinary practice, directly connected together or fitted to abut at their inner sides, and they adjoin each other closely only throughout the shorter middle portion of the length of the smoke box seats at the inner sides thereof, as will be seen by reference to Figs. 1, 7 and 8. The connection of the cylinder members, one to the other, and to the frame members, 9, 9, of the locomotive, is effected through an interposed connecting member which is shown in detail in Figs. 3 to 6 inclusive, and is of the following construction: The connecting member, the characteristic features of which are that it performs the function of supporting the cylinder members above described, and does not contain any steam or exhaust passages, such as are embodied in the cylinder saddles and independent intermediate bed plates of prior practice, comprises, in an integral casting of box form, a horizontal base plate, 10, the length of which is equal to the distance between the frame members, 9, and which is provided with downwardly extending flanges, 10$^a$, adapted to abut against said frame members, and to be secured thereto by bolts, 11, and nuts; two smoke box seats, 10$^b$, located at the ends of its top, each of which is transversely curved to the same radius as the smoke box seats of the cylinder members, and is adapted to fit against the two adjoining end portions thereof; two substantially vertical end webs, 10$^c$, each connecting one of the smoke box seats with the base plate; two inclined side webs, 10$^d$; and a central vertical web, 10$^e$, each of the webs, 10$^c$ and 10$^d$, connecting both the smoke box seats with the base. The smoke box seats of the cylinder members and connecting member are perforated for the passage of bolts by which the smoke box of the locomotive is secured to them, and the cylinder members are supported, through their connecting member bearings, 7, on the base plate, 10, of the connecting member, to which they are secured by vertical bolts, 12, and nuts. The cylinder members are also connected to the frame members by bolts, 13, and nuts.

Figs. 11 to 13 inclusive, illustrate a structural modification of the connecting member, under which it performs the additional functions of supporting an equalizing bearing and a front bumper casting. To this end, the lower portion of the central vertical web, 10$^e$, is formed of two parallel members, which are connected at top by a horizontal equalizer bearing plate, 10$^f$, having recesses in its lower face, serving as bearings for an equalizer, 14. The web, 10$^e$, extends as a single plate, from the top of the equalizer bearing plate to the smoke box seats. The base plate, 10, is extended forwardly to provide a front bumper casting, 10$^g$, in the longitudinal central plane of which there is formed a center pin guide, 10$^h$, and on its front end, a vertical flange, 10$^i$, for the connection of a bumper beam.

The cylinder members and connecting member which are shown in Figs. 14 and 15, conform, in all essential particulars, to those hereinbefore described, and differ in structural detail therefrom in being adapted for connection to frame members, 9$^a$, which are of the "slab" type, instead of to "bar" frame members, 9, as in the instance first described. The connecting member bearings, 7, of the cylinder members, are, in this case, dispensed with; the side webs, 10$^d$, of the connecting member, are shouldered to fit over the tops of the frame members; and the cylinder members are secured to the interposed connecting member by horizontal bolts, 15, passing through the flanges, 3, and the webs, 10$^d$, and flanges, 10$^a$, and through the frame members, and provided with proper nuts. An annular groove, 10$^k$, is formed in the base plate of the connection member, for the reception of a corresponding ring on a center casting.

The cylinder members and connecting member herein set forth may be made of cast steel, and by reason of the location of all steam ports and passages in the cylinder members, the construction of the connecting member is correspondingly simplified, and its function limited to that of supporting the complete structure. The resultant advantage, in point of greater facility of molding, and of providing readily detachable and interchangeable cylinders, of ample strength with a minimum of weight, will be apparent to those familiar with locomotive engine construction and operation. It will also be seen that the interposition of the end portions of the connection member between the cylinder members, eliminates the shearing strain to which the transverse connecting bolts of the ordinary constructions are necessarily subjected.

I claim as my invention and desire to secure by Letters Patent:

1. The combination of two locomotive cylinder members, each comprising a cylinder, a distribution valve chest, and steam and exhaust passages, said cylinder members abutting at their middle portions; an interposed connection member, of box form, adapted to fit between the end portions only of the cylinder members, and entirely clear of their steam and exhaust passages; and means for securing the cylinder members to the connection member.

2. The combination of two locomotive cylinger members, each comprising a cylinder, a distribution valve chest, and steam and exhaust passages, said members having smoke box seats on their tops, an interposed connection member having smoke box seats on its top registering with those of the cylinder members, and means for securing the cylinder members to the connection member.

3. The combination of two locomotive cylinder members, each comprising a cylinder, a distribution valve chest, and steam and exhaust passages, said members having smoke box seats on their tops which are adapted to adjoin at their middle portions and are of greater length on their outer sides than on their adjoining middle portions; a connection member interposed between said cylinder members and having smoke box seats on its top abutting against the inner end portions of the cylinder member smoke box seats; and means for securing the cylinder members to the connection member.

4. The combination of two locomotive cylinder members, each comprising a cylinder, a distribution valve chest, steam and exhaust passages, and horizontal bearings adjoining its ends; an interposed connection member, of box form, adapted to fit between the end portions only of the cylinder members, and entirely clear of their steam and exhaust passages and having a base plate adapted to support the bearings of the cylinder members; and means for securing said bearings to said base plate.

5. The combination of two locomotive cylinder members, each comprising a cylinder, a distribution valve chest, steam and exhaust passages, and longitudinal flanges adapted to abut against the outer sides of the locomotive frame members; an interposed connection member, of box form, adapted to fit between the end portions only of the cylinder members, and entirely clear of their steam and exhaust passages, and having downwardly depending lateral flanges adapted to abut against the inner sides of locomotive frame members; and means for securing the cylinder members to the connection member through said longitudinal and lateral flanges.

6. A locomotive cylinder member comprising, in an integral casting, a cylinder proper, a distribution valve chest, steam and exhaust passages, a lower longitudinal flange and an upper smoke box seat which is of greater length on its outer side than on the middle portion of its inner side, to provide end bearings for an abutting connection member.

7. A locomotive cylinder member comprising, in an integral casting, a cylinder proper, a distribution valve chest, steam and exhaust passages, an upper smoke box seat, induction and eduction passages connecting the cylinder proper and valve chest adjacent to their ends, and strengthening webs adjoining said ports and connecting the cylinder and valve chest.

8. The combination of two locomotive cylinder members, each comprising a cylinder, a distribution valve chest, and steam and exhaust passages; an interposed connection member, of box form, adapted to fit between the cylinder members, adjoining their ends; two locomotive frame members; means for securing the cylinder members to the connection member; and means for independently securing the cylinder members to the frame members.

9. A connection member for locomotive cylinders, comprising, in an integral casting, a base plate, two upper smoke box seats which are separated by an intermediate space for the reception of cylinder members, webs connecting the smoke box seats to the base plate, and downwardly depending lateral flanges for connection to locomotive frame members.

10. A connection member for locomotive cylinders, comprising, in an integral casting, a base plate, a front bumper casting projecting forwardly therefrom, an upper smoke box seat, a vertical web connecting said smoke box seat with the base plate, and a horizontal equalizer bearing plate formed on said vertical web.

FRANK F. SCOVILLE.

Witnesses:
DAVID SHIRRELL,
MABEL SCOVILLE.